Patented Jan. 3, 1939

2,142,965

UNITED STATES PATENT OFFICE 2,142,965

NITROGENOUS FERTILIZER

William J. Hale, Midland, Mich., assignor to The Dow Chemical Company, Midland, Mich., a corporation of Michigan No Drawing. Application June 4, 1936, Serial No. 83,590

2 Claims. (Cl. 71—29)

This invention concerns certain new nitrogenous fertilizers and a method of making the same.

The new fertilizers herein disclosed are prepared by heating a solid porous organic carrier material such as peat or straw with one or more agents, which are potentially reactive to form urea, under conditions such that urea, water-insoluble derivatives thereof, and other nitrogen compounds are formed in situ within the carrier body. The fertilizer products are granular, non-hygroscopic, and easy to handle in ordinary drills. They generally contain a considerable portion, e. g. one-fifth or more, of their nitrogen in water-insoluble but plant-available form, the remainder of the nitrogen being for the most part both water-soluble and plant-available. Such fertilizers possess the advantage of furnishing a portion of their nitrogen in a form immediately available to plants and of containing a reserve store of nitrogen which becomes more gradually available to plants and which, because of its water-insolubility, is not readily washed from the soil by heavy rains, etc. Such fertilizers are further advantageous in that they may be applied to provide a higher concentration of nitrogen in the soil without danger of injury to plant life than would be possible when using a fertilizer containing all of its nitrogen in water-soluble form. The new fertilizers are further advantageous in that they may be prepared readily and at low cost from beginning materials which are available in large quantities. Furthermore, during or subsequent to their preparation other fertilizing agents, e. g. potassium compounds, magnesium compounds, phosphates, etc., may be incorporated therewith to form a complete and balanced fertilizer. The invention, then, consists in the new fertilizers and method of making the same hereinafter fully described and particularly pointed out in the claims.

As hereinbefore stated my process for making nitrogenous fertilizers consists essentially in heating a solid, porous organic carrier material with one or more agents which are potentially reactive to form urea under conditions such that urea, relatively water-insoluble urea derivatives, and other nitrogen compounds are formed in situ within the carrier mass. For convenience, such operation of forming urea and the relatively insoluble nitrogen compounds in situ within a carrier mass is hereinafter referred to as "carbaminating" said carrier material and the latter, when so-treated, is spoken of as being "carbaminated".

Any of a variety of solid porous organic carrier materials such as peat, straw, lignin, sawdust, corn stalks, cotton stalks, the solid organic waste materials from the manufacture of sugar and alcohol, the solid residue from sewage disposal plants, etc., may be carbaminated according to the present process to produce a nitrogenous fertilizer. However, I prefer to employ a cellulosic material such as peat or straw, since such materials are rich in humic acids, or on decaying produce humic acids, which actively promote the growth of plants.

Any of a variety of carbaminating agents may also be employed, it being necessary merely that such agent or agents be capable of reacting at high temperatures to form urea as a major product. In practice, I prefer to employ ammonium carbamate or a mixture of ammonia and carbon dioxide as the carbaminating agent, but other agents such as ammonium carbonate, cyanamide, ammonium acid carbonate, etc., may be employed if desired. Regardless of the particular carbaminating agent which may be employed, it is advantageous to carry the carbamination out under pressure in the presence of excess ammonia (over that theoretically required to react with other agents such as carbon dioxide to form urea) since the presence of such excess ammonia and the application of pressure promote the reactions for the formation of urea and its derivatives.

The reactions for the conversion of urea into its relatively insoluble derivatives may also be promoted by the presence of an acid or acidic material, e. g. phosphoric acid, potassium acid phosphate, magnesium acid phosphate, etc. Such reaction promoters are, in themselves, useful fertilizing agents and by employing them in proper proportion a complete and balanced fertilizer may be obtained directly as the product from my process. However, the carbamination may be carried out in the absence of such reaction promoters in which case the carbaminated product may, if desired, be mixed with other fertilizing agents, e. g. potassium compounds, phosphates, etc., to obtain a complete fertilizer.

The carbamination is carried out at temperatures above 150° C., the temperature chosen controlling to a large extent the proportion of fixed nitrogen which is obtained in water-insoluble form. In general, at temperatures between 150° and 180° C. approximately 0.2–0.5 of the nitrogen fixed in the fertilizer product is of the water-insoluble type, whereas at higher temperatures more than 0.5 of the fixed nitrogen is obtained in insoluble form. Other factors, such as the kind of porous organic carrier material employed, the time of heating during carbamination, etc., influence to some extent the ratio of water-insoluble nitrogen to total nitrogen in the carbaminated product. For instance, by heating a reaction mixture at temperatures somewhat above 180° C. for only a short time, e. g. 10 to 30 minutes, it is possible to obtain a product containing more than half its nitrogen in water-soluble form and by heating such reaction mixture at temperatures somewhat below 180° C., e. g. to 170° C., for a long period of time, e. g. 10 hours, a product may be obtained containing more than half its nitrogen in water-insoluble form. Ordinarily, temperatures above 300° C. are avoided in carrying out the carbamination, although higher temperatures, e. g. 400° C., can be employed if desired.

In practice, an organic carrier material such as peat or straw is carbaminated by heating the same with a mixture of carbon dioxide and ammonia, or equivalent carbaminating agent such as ammonium carbamate, in an autoclave at temperatures above 150° C. for from 1 to 10 hours, preferably 2 to 4 hours. Shorter or longer periods of heating may be employed, if desired. An excess of carbon dioxide or ammonia, preferably the latter, over that theoretically required to form urea, may advantageously be present in the autoclave during the heating for the purpose of promoting the formation of urea and its derivatives in accordance with the law of mass action. The autoclave is then cooled, free ammonia, carbon dioxide, etc., are released therefrom and collected for use in subsequent carbaminations, and the fertilizer product is removed and dried. The dried product is a granular, non-hygroscopic material containing a substantial proportion, usually more than 5 per cent by weight, of fixed nitrogen. It contains nitrogen in both the water-soluble and water-insoluble forms, the water-insoluble nitrogen representing 0.2 or more of its total nitrogen content. It is not a simple mechanical mixture of the carrier material and the nitrogen compounds, since the carrier material, e. g. peat, straw, etc., is thoroughly impregnated with nitrogenous materials. Not only are the cells, pores, etc., of a carrier material such as peat or straw charged with nitrogen compounds, but also such carrier material enters into chemical reaction with urea and ammonia during the carbamination, thus forming at least a portion of the water-insoluble nitrogen compounds contained in the product.

The following examples illustrate a number of ways in which the principle of the invention has been applied, but are not to be construed as limiting the invention.

*Example 1*

A mixture of 47 grams of peat containing 50 per cent by weight of water (23.5 grams of peat on a dry basis) and 47 grams of ammonium carbamate was heated to 160° C. in an autoclave for 2 hours. The autoclave was then cooled, and the charge removed and air dried. The product which after drying weighed 35.5 grams, was a granular brown material containing 12 percent by weight of nitrogen. Of the nitrogen contained in the product, 63.8 per cent was extractable with water at room temperature, the remaining 36.2 per cent being of the water-insoluble type.

*Example 2*

A mixture of 660 grams of peat containing 25 per cent by weight of water (495 grams of peat on a dry basis) and 660 grams of ammonium carbamate was heated in an autoclave to 160° C. for 2 hours, after which the autoclave was cooled and the charge removed and air dried. The dried product weighed 583 grams and contained 10.5 per cent by weight of nitrogen. Approximately 53 per cent of the nitrogen contained in the product was soluble in water, 47 per cent being water-insoluble. The product resembled that of Example 1 in physical appearance.

*Example 3*

A mixture of 12 grams of dry peat, 10 grams of ammonium carbamate, and 11.28 grams of carbon dioxide was heated to 160° C. in an autoclave for 6 hours after which the product was removed and allowed to stand in exposure to air as in Example 1. There was obtained 12.4 grams of product as a brown granular material containing 10.6 per cent by weight of nitrogen. Approximately 50 per cent of the nitrogen in the product was of the water-soluble type, the remainder being insoluble in water.

*Example 4*

A mixture of 12 grams of peat containing 17 per cent of water (10 grams of peat on a dry basis) and 20 grams of ammonium carbamate was heated in an autoclave to 200° C. for 2 hours after which the product was removed and air dried. There was obtained 12.7 grams of the dried product as a brown granular material containing 10.5 per cent by weight of nitrogen. Approximately 44.9 per cent of the nitrogen in the product was soluble in water, the remaining 55.1 per cent being of the water-insoluble type.

*Example 5*

A mixture of 20 grams of peat containing approximately 50 per cent by weight of water (10 grams of peat on a dry basis) and 20 grams of ammonium carbamate was heated to 250° C. in an autoclave for 2 hours. The product was then removed and dried as in Example 1. There was obtained 10.7 grams of product in the form of a brown granular material containing approximately 10.3 per cent by weight of nitrogen. Approximately 40.9 per cent of the nitrogen in the product was extractable with water at room temperature, the remaining 59.1 per cent being of the water-insoluble type.

*Example 6*

A mixture of 10.7 grams of peat containing 7 per cent of water (10 grams of peat on a dry basis), 20 grams of ammonium carbamate, and approximately 11.3 grams of carbon dioxide was heated to 250° C. in an autoclave for 2 hours, after which the product was removed and dried as in Example 1. There was obtained 17 grams of product as a brown granular material containing approximately 10.4 per cent by weight of nitrogen. Approximately 18 per cent of the nitrogen in the product was extractable with water, the remaining 82 per cent being of the water-insoluble type.

In the above specific examples it will be noted that the fertilizer products prepared by carbaminating peat at temperatures below 180° C. contained 50 per cent or more of their nitrogen in water-soluble form, but also contained a considerable proportion of the nitrogen in water-insoluble form. Examples 3–6 show that products prepared by carbaminating peat at temperatures above 180° C. generally contain more than 50 percent of their nitrogen in water-insoluble form, but also contain a substantial proportion of water-soluble nitrogen. Example 6, as compared with Example 5, shows that the presence of excess carbon dioxide during a carbamination promotes the fixation of nitrogen in the product and also results in an increase in weight of fertilizer product from the treatment.

Although ammonium carbamate is the only carbaminating agent employed in the foregoing specific examples, other carbaminating agents may be employed with equal success. For instance, I have prepared a number of fertilizers by heating peat, wood pulp, etc., with mixtures of ammonia and carbon dioxide under pressure at temperatures above 150° C. Each such fertilizer product contained a substantial proportion, i. e. more than 0.2, of its nitrogen in water-insoluble form. The following is an example demonstrating the preparation of a balanced fertilizer by treating peat at elevated temperature and pressure with a mixture of ammonia and carbon dioxide in the presence of potash and an acid phosphate.

*Example 7*

500 grams of super-phosphate (18 per cent $P_2O_5$) was intimately mixed with 30 grams of potash, 41 grams of peat, and 50 grams of solid carbon dioxide. The mixture was placed in a chrome-nickel-steel autoclave, the autoclave was sealed and 38.6 grams of liquid ammonia was admitted through an inlet tube. The material within the autoclave was heated to approximately 160° C. and held at this temperature for two hours. The product was allowed to cool gradually and was then discharged and allowed to air-dry. The product weighed 577.2 grams and was of free-flowing character. Analysis showed it to comprise a 16:4:4 mixture.

I have also prepared balanced fertilizers by carbaminating peat in the presence of potash and phosphoric acid and have prepared other balanced fertilizers by mixing carbaminated peat with potash, phosphoric acid, calcium acid phosphate, etc.

In brief, the present invention comprises carbaminating a porous organic carrier material such as peat, straw, etc., by heating the same under pressure to a temperature above 150° C., with one or more agents which are potentially reactive to form urea and it also comprises the fertilizer products obtained by such treatment and mixtures of such fertilizer products with other fertilizing agents, e. g. non-nitrogenous fertilizing agents such as potash, phosphates, magnesium compounds, etc.

This application is a continuation-in-part of my copending applications Serial No. 707,221, filed January 18, 1934; Serial No. 712,062, filed February 19, 1934; and Serial No. 757,923, filed December 17, 1934.

In the claims the expression "agent potentially reactive to form urea" refers to a compound or mixture, e. g. ammonium carbamate, ammonium carbonate, a mixture of ammonia and carbon dioxide, etc., which may be heated to form urea.

Other modes of applying the principle of the invention may be employed instead of those explained, change being made as regards the method or products herein disclosed, provided the steps or substances stated by any of the following claims or the equivalent of such stated steps or substances be employed.

I therefore particularly point out and distinctly claim as my invention:—

1. A fertilizer prepared by treating a porous organic carrier material at a temperature above 180° C. with both an added agent which in itself is potentially reactive to form urea and an acid phosphate in proportion sufficient to provide plant food value.

2. The method of making a fertilizer which comprises heating a porous organic carrier material under pressure to a temperature above 150° C. in the presence both of an acid phosphate in proportion sufficient to furnish plant food value and an added agent which in itself is potentially reactive to form urea.

WILLIAM J. HALE.